April 8, 1952    G. L. KOTHNY    2,592,295
APPARATUS FOR DETERMINING THE TIME OF DESCENT
OF INSTRUMENTS WITHIN BOREHOLES
Filed March 11, 1946
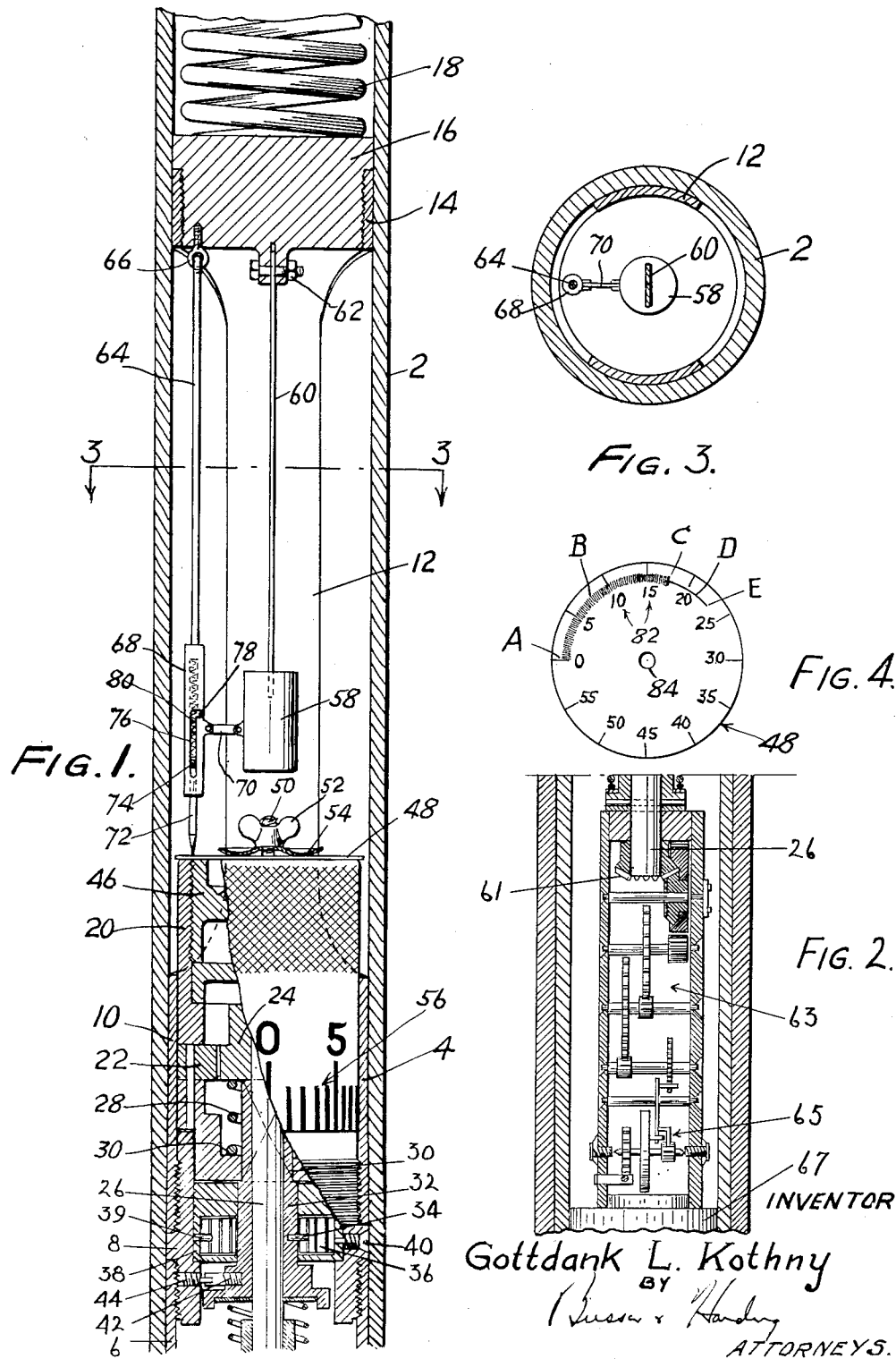
INVENTOR
Gottdank L. Kothny
BY
ATTORNEYS.

Patented Apr. 8, 1952

2,592,295

UNITED STATES PATENT OFFICE 2,592,295

APPARATUS FOR DETERMINING THE TIME OF DESCENT OF INSTRUMENTS WITHIN BORE HOLES

Gottdank L. Kothny, Strafford, Pa., assignor to Sperry-Sun Well Surveying Company, Philadelphia, Pa., a corporation of Delaware Application March 11, 1946, Serial No. 653,684

5 Claims. (Cl. 346—7)

1

This invention relates to apparatus for timing the descent of instruments such as well surveying instruments within bore holes particularly when the descent is effected in go-devil fashion, i. e., by permitting the instrument to fall freely through the mud within a drill stem.

A common method of using well surveying instruments involves the dropping of the instruments through a drill stem containing mud prior to the removal of the drill stem for the purpose of replacing a bit or for some other reason, by virtue of which removal the instrument, having attained a position adjacent to the bit, is recovered. When instruments are so used they are provided with timing means for the purpose of controlling the making of a record or for the purpose of rendering the recording means in the instrument inactive so as to prevent the making of undesired duplicate records. Certain of these instruments, as particularly exemplified by the photographic type, are provided with clockwork mechanisms, the function of which is to delay the making of a record by exposure of a photographic film until such time as the instrument has reached a position of rest at the lower end of the drill stem. The operator in such case in preparing the instrument for use must estimate the time which will elapse between the enclosure of the instrument in its protective casing and the time when it will have reached a position of rest so that the parts are in condition for the making of a proper record without blurring. In another type of instrument the recording apparatus is continuously in operative condition during the descent of the instrument and for some period thereafter. In this latter type of instrument the recording action is a slow one so that the vibration of the instrument on its way down the bore hole and during the previous handling at the surface will not make a record which would be confused with or mar the desired record. A record in such instrument will only be made in identifiable fashion after the instrument reaches the lower end of the drill stem and remains at rest for a substantial period. In the case of such instruments, however, it is desirable to provide means for interrupting the activity of the recording devices after a period of sufficient duration to permit the instrument to make the desired record so

2 that undesired duplicate records will not be made during a cessation of movement occurring in the period of removal of the instrument. The removal of a drill stem from a deep hole is a time consuming operation and generally cannot be carried out continuously so that one or more periods of rest may occur during the removal, within which periods a record would be made if the recording means continued active.

In both of these cases it will be evident that the operator should make a good estimate of the time which will elapse between the setting of the instrument and the time when it reaches the lower end of the drill stem. Heretofore, the operator has been required to guess this time and set the instrument accordingly. In the case of an instrument provided with a time control which determines the making of a record it has been necessary to make a time estimate substantially in excess of the expected time of descent so that there will be assurance that the instrument will be at rest at the time the record is made. The result is that the making of a survey takes an undue amount of time, the instrument probably being at rest long before the end of the period of a safe estimate. In the case of the second mentioned type of instrument safety again requires that the instrument should be kept in motion following the making of a record for a sufficient time to insure that the device rendering the recording means inoperative will have performed its result, its setting being necessarily such that it will not render the recording means inoperative before a record is made.

As will be evident in both cases a more accurate knowledge of the time of descent of the instrument will be of substantial value in enabling the operator to shorten the time necessary for a survey as well as permitting him to undertake various operations either before or after the recording action with assurance that the making of a record will not be subject to interference.

The time required for descent of an instrument cannot be determined with any degree of accuracy from any theoretical considerations. The depth through which the instrument must move, the density of the mud, the rate of mud flow if circulation is continued during the descent of the instrument, the condition of the drill stem and other matters, all enter as factors in the time of descent of the instrument.

In accordance with the present invention there is provided a means for securing a recording of the time of descent of the instrument to its position of rest. Prior to the time of first use of the instrument in a bore hole the use of this apparatus will give information as to the time of descent, which may then be used thereafter for a better estimate of the time of descent in subsequent surveys in the same hole in view of the generally warranted assumption that the density of the mud and other conditions will be closely the same and that, accordingly, the only difference in time of descent will arise as a result of the different depths at which the subsequent surveys were taken. Of course, if a different type of mud is used a further determination of the time of descent will be desirable, this being also true if other conditions are changed, such as replacement of the drill stem sections. In any event, information as to the time of descent is of considerable value for improving the time estimates for subsequent surveys.

The broad object of the present invention is accordingly the provision of an apparatus for determining the time of descent of an instrument. Preferably, this apparatus is used in a preliminary run of the protective casing through the drill stem containing what amounts to a dummy instrument, i. e., a weight which together with the apparatus is equivalent to that of the instrument to be used thereafter. Alternatively, the apparatus may be used in conjunction with the instrument in an active run, in which case, of course, a safe estimate of the dropping time must be made in accordance with practices heretofore followed. Once the time of descent has been accurately ascertained, however, subsequent operations may be carried out in view thereof with a consequent shortening of the time of survey or with the attainment of greater leeway in the operations performed. Other objects of the invention relating to details of construction will become apparent from the following description read in conjunction with the accompanying drawings in which:

Figure 1 is a vertical section through a protective casing and the upper part of the time determining apparatus therein;

Figure 2 is a vertical section constituting a lower continuation of Figure 1;

Figure 3 is a transverse section taken on the plane indicated at 3—3 in Figure 1; and Figure 4 is a plan view of a replaceable disc on which the record of the time of descent is made.

In the embodiment of the invention illustrated a protective casing of the usual pressure-resistance variety is illustrated at 2. Within this there is ordinarily located a surveying instrument which may, for example, be of the type illustrated in the application of Roland Ring, Serial Number 629,052, filed November 16, 1945, now Patent No. 2,559,373, July 3, 1951. While the instrument of this Ring application may be cited to illustrate the use of the invention it will be evident that the invention is applicable to the timing of the descent of surveying instruments in general.

The Ring application is particularly referred to, however, since it illustrates a clockwork mechanism controlled by an escapement and which slowly rotates a rotary knob about a longitudinal axis, which knob may carry a record disc in the present apparatus. Consequently, there is described herein as a clockwork mechanism for the present apparatus substantially the clockwork mechanism disclosed in said Ring application. This clockwork mechanism is designated generally by the numeral 4.

A tubular portion 6 of the timing device of the type shown in said Ring application is secured to a coupling 8 to which, in turn, is threaded the lower portion 10 of a support for the elements of the time measuring apparatus, this member replacing the removable cap illustrated in the Ring application. The member 10 has upwardly extending portions 12 forming an open structure or framework, which portions terminate in a ring 14 into which is threaded a head 16. The assembly may be mounted in the protective casing in any conventional fashion, being supported by a spring mounted bolt or being located between shock absorbing springs, the upper one of which is illustrated at 18. A time setting knob 20, similar to that illustrated in the Ring application, is knurled on its exterior surface for manipulation by the operator and is provided with a tooth 22 arranged to engage between teeth of a pinion 24 carried by the upper end of a shaft 26 which, as illustrated in said Ring application, has its rotation controlled by a clockwork escapement mechanism. A spring 28 reacts between the pinion 24 and an inwardly directed shoulder 30 of the setting knob 20. Surrounding the shaft 26 is a sleeve 32 which has a square portion 33 received in a square hole 35 in the lower end of the knob 20 so that the knob and this sleeve are constrained to rotate together while, nevertheless, the knob may be moved axially relatively to the sleeve for the purpose of disengaging the tooth 22 from the pinion 24. A pin 34 carried by the sleeve is connected to one end of a spring 36, the other end of which is secured to a pin 39 carried by a bushing 38 which is secured against rotation in the coupling 8 by a set screw 40. In order to limit rotation of the sleeve 32 it is provided with a pin 42 arranged to operate with a stop pin 44 carried by the coupling 8.

Gearing 61 on the lower end of the shaft 26 connects it to a clockwork mechanism indicated at 63 having an escapement 65 for controlling the rate of rotation of the shaft 26. This is described in said Ring application.

In the operation of this apparatus the knob 20 is pulled outwardly to disengage the tooth 22 from the pinion 24, is then rotated to a desired extent to produce a time delay, this being indicated by markings 56 on the knob in conjunction with an index marking 57 on the coupling 8, and the knob is then released to engage the tooth 22 between teeth of the pinion 24. The result is to wind the spring 36, which is under preliminary tension, with the final result that after release the mechanism runs down at a speed controlled by the escapement mechanism, the knob 20 turning at a slow rate until the pin 42 engages the stop 44.

In accordance with the present invention there is secured to the knob 20 and its central plug 46 a record disc 48 clamped thereon by a wing nut 52 and a resilient washer 54, the nut being threaded upon a screw 50 carried by the plug 46.

A weight 58 is carried by the lower end of a flat spring 60 secured at 62 to the head 16. The spring is preferably sufficiently stiff so that despite inclination of the instrument the weight 58 will not depart substantially from its central position due to its weight alone although transverse shocks to which the instrument is subjected will cause the spring and weight to vibrate transversely to the plane of the spring 60. A link 64 loosely pivoted, for example, in an eye 66 threaded into the head 16 is provided with an enlarged lower end 68 connected by a short link 70 to the weight 58. Within a bore at the end 68 of the link 64 there slides a pointed stylus 72 provided with a transverse pin 74 extending through a slot 76 in the end 68, which slot, at its upper end, has a turned portion 78 in which the pin may rest to hold the stylus away from the record disc 48. A spring 80 normally urges the stylus into contact with the record disc.

The record disc which is illustrated particularly in Figure 4, is provided with printed time indications 82, for example at five minute intervals. It is provided with a central hole 84 receivable over the screw 50 at the upper end of the plug 46. The surface of the record number 48 may be conveniently coated with wax or some other similar material in which the stylus may produce markings.

In the present apparatus there is provided a weight 67 which, together with the other parts of the apparatus, bring the total weight within the protective casing up to the value of the weight of the surveying instrument which is to be used in subsequent surveys, so that the descent of the time determining apparatus within the bore hole will be, in all respects, identical with the descent of the same case containing the well surveying instrument. Thus it may be deduced that the time of descent of this complete apparatus will correspond to the time of descent of the well surveying apparatus.

In the use of the apparatus the stylus 72 is raised so as to be held away from the disc position by engagement of the pin 74 in the turned portion 78 of the slot 76 and a record disc 48 is then placed in position on the knob 20 and clamped thereto preferably being turned to such position that its zero will coincide with the stylus position when the knob is rotated to a position determining the estimated time interval within which the apparatus will come to rest. This latter positioning of the disc 48, however, is unnecessary since, through the use of the markings, the interval of movement of the stylus may be easily read even though the markings may not begin at zero. Just prior to insertion of the apparatus in the protective casing the stylus is released so as to bear upon the record disc. At this time the disc may be finally adjusted to have its zero mark coincide with the stylus position, if desired.

The handling of the apparatus in placing it in the protective casing and into the upper end of the drill stem, and the shocks to which the instrument is subjected as it passes down the drill stem will cause the stylus to vibrate thereby producing markings on the record disc as indicated at B, starting at A and running to some such position as indicated at C, the latter position being attained when the instrument comes to rest at the lower end of the drill stem. These vibrations are radial and the resulting record will consist, in general, of a widened arc running about the periphery of the record disc through an angular distance corresponding to the elapsed time between release of the stylus and the attainment by the instrument of a position of rest. After the instrument comes to rest, however, the stylus will mark on the disc only a thin line corresponding to its point as indicated at D terminating at E when the timing mechanism has run down. Following the period of rest, if the timing mechanism has not completely run down, there may be again produced a widened record due to the renewed vibration of the stylus as the drill stem is raised. Finally, however, when the timing mechanism has completely run down, i. e., when the pin 42 engages the stop 44, the record is terminated. Of course, if the instrument meanwhile comes to rest a thin line will again be traced. Nevertheless, the interval between A and C will constitute an accurate measurement of the time which has elapsed between the freeing of the stylus and the attainment by the instrument of its position at the lower end of the drill stem. The interval thus ascertained may be used as indicated above in determining the proper setting of the timing mechanism of the well surveying instrument for subsequent operations. Correction may, of course, be made for additional depth for subsequent surveys.

While preferably the time determining apparatus is used as described above separately from the surveying apparatus, it will be evident that if the vibrating parts are made quite light the apparatus may be directly associated with a surveying apparatus such as disclosed in said Ring application, the record disc for the time measurements then being secured directly to the time adjusting knob of the surveying instrument. Some slight error, of course may be involved in that such case the total weight will be somewhat in excess of the total weight which is involved when the surveying instrument is used alone in usual fashion. However, this situation may be corrected to two identical weights merely by providing on the well surveying instrument an additional weight equivalent to that of the special elements of the device for measuring the time of descent. If the descent time apparatus is associated with a surveying instrument, a record of inclination may, of course, be made in the run which has as a further object the determination of the time of descent. In such case the operator must make an estimate of the time of descent in the usual fashion in setting the clockwork mechanism.

What I claim and desire to protect by Letters Patent is:

1. A device for making measurements within a bore hole comprising a protective casing, a clockwork timer in said protective casing, a record member driven by said timer, a stylus suspended above said record member, and a movable weight suspended above said record member, said weight being linked to said stylus.

2. A device for making measurements within a bore hole comprising a protective casing, a clockwork timer in said casing, a rotatable and axially movable record member driven by said timer, and a stylus suspended above said record member.

3. A device for making measurements within a bore hole comprising a protective casing, a clockwork timer in said casing, a rotatable and axially movable record member driven by said timer, spring means biasing said record member into engagement with said timer, and a stylus suspended above said record member.

4. A device for making measurements within a bore hole comprising a protective casing, a clockwork timer in said casing, a rotatable and axially movable record member driven by a pinion connected to said timer, said pinion meshing with gear teeth on said record member, and a stylus suspended above said record member.

5. A device for making measurements within a bore hole comprising a protective casing, a clockwork timer in said casing, a rotatable and axially movable circular record member driven by said timer, and a stylus suspended above said record member, said stylus being movable radially with respect to said record member as said record member rotates.

GOTTDANK L. KOTHNY.

REFERENCES CITED

The following references are of record in the file of this patent:

UNITED STATES PATENTS

| Number | Name | Date |
|---|---|---|
| 959,912 | Bell | May 31, 1910 |
| 963,055 | Miller | July 5, 1910 |
| 1,078,867 | McGraw | Nov. 18, 1913 |
| 1,493,067 | Cool | May 6, 1924 |
| 1,634,992 | Gardner | July 5, 1927 |
| 1,696,420 | Stout | Dec. 25, 1928 |
| 1,992,134 | Toewe | Feb. 19, 1935 |
| 2,305,944 | Wiley | Dec. 22, 1942 |
| 2,317,386 | Kothny | Apr. 27, 1943 |